(12) United States Patent
Lewis et al.

(10) Patent No.: US 10,855,629 B2
(45) Date of Patent: *Dec. 1, 2020

(54) NOTIFICATION DELIVERY MECHANISM FOR PRESENT VIEWING USERS

(71) Applicant: Google LLC, Mountain View, CA (US)

(72) Inventors: Justin Lewis, Marina Del Rey, CA (US); Joseph Cohen, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,778

(22) Filed: Jan. 28, 2019

(65) Prior Publication Data

US 2019/0158438 A1 May 23, 2019

Related U.S. Application Data

(63) Continuation of application No. 15/374,518, filed on Dec. 9, 2016, now Pat. No. 10,193,832.

(51) Int. Cl.
| | |
|---|---|
| *G06F 15/16* | (2006.01) |
| *H04L 12/58* | (2006.01) |
| *H04L 29/08* | (2006.01) |
| *H04L 29/06* | (2006.01) |
| *H04L 12/26* | (2006.01) |

(52) U.S. Cl.
CPC ............ *H04L 51/04* (2013.01); *H04L 51/043* (2013.01); *H04L 51/24* (2013.01); *H04L 51/26* (2013.01); *H04L 65/1083* (2013.01); *H04L 65/4061* (2013.01); *H04L 65/604* (2013.01); *H04L 67/22* (2013.01); *H04L 67/26* (2013.01);
(Continued)

(58) Field of Classification Search
CPC ..... H04L 51/04; H04L 51/26; H04L 65/4061; H04L 65/604; H04L 67/22; H04L 67/26; H04L 67/306; H04L 43/10; H04L 67/1095; H04L 67/2842
See application file for complete search history.

(56) References Cited

U.S. PATENT DOCUMENTS

| | | | |
|---|---|---|---|
| 7,756,744 B2* | 7/2010 | Schiff | G06Q 20/10 705/14.49 |
| 7,895,078 B2* | 2/2011 | Schiff | G06Q 20/10 705/14.49 |

(Continued)

FOREIGN PATENT DOCUMENTS

| | | |
|---|---|---|
| WO | 2014/042607 A1 | 3/2014 |
| WO | 2015/073722 A1 | 5/2015 |

OTHER PUBLICATIONS

The Science Behind Influence TM http://www.yume.com/technology, Jun. 20, 2016.

*Primary Examiner* — Moustafa M Meky
(74) *Attorney, Agent, or Firm* — Lowenstein Sandler LLP

(57) ABSTRACT

Implementations disclose a notification delivery mechanism for present viewing users. A method includes identifying a notification to be sent to a user having a plurality of user devices; selecting a first user device of the plurality of user devices based on a playback state of the first user device; and upon selecting the first user device, transmitting the notification to the first user device without transmitting the notification to other user devices of the plurality of user devices.

20 Claims, 6 Drawing Sheets

(52) U.S. Cl.
CPC ............ *H04L 67/306* (2013.01); *H04L 43/10* (2013.01); *H04L 67/1095* (2013.01); *H04L 67/2842* (2013.01)

(56) References Cited

U.S. PATENT DOCUMENTS

| | | |
|---|---|---|
| 9,015,243 B1 | 4/2015 | Queru |
| 9,400,631 B2* | 7/2016 | Chan ........................ G06F 3/165 |
| 9,402,167 B2* | 7/2016 | Barat ................ G06F 15/17312 |
| 10,193,832 B2* | 1/2019 | Lewis ..................... H04L 67/22 |
| 10,332,158 B2* | 6/2019 | Sullivan ............. G06Q 30/0277 |
| 10,541,958 B2* | 1/2020 | Tal ........................ H04L 67/327 |
| 2004/0221304 A1 | 11/2004 | Sparrell et al. |
| 2006/0020690 A1* | 1/2006 | Richards ............. H04L 12/2803 |
| | | 709/221 |
| 2010/0083255 A1 | 4/2010 | Bane et al. |
| 2010/0312647 A1* | 12/2010 | Schiff .................... G06Q 20/10 |
| | | 705/14.61 |
| 2011/0196743 A1* | 8/2011 | Schiff .................... G06Q 20/10 |
| | | 705/14.58 |
| 2013/0218942 A1* | 8/2013 | Willis ................ H04L 65/1069 |
| | | 709/201 |
| 2013/0219023 A1 | 8/2013 | Surianarayanan et al. |
| 2014/0253813 A1 | 9/2014 | Bakar |
| 2014/0280578 A1* | 9/2014 | Barat ................ G06F 15/17312 |
| | | 709/204 |
| 2015/0046580 A1* | 2/2015 | Sasagawa .......... G06Q 30/0255 |
| | | 709/224 |
| 2016/0019020 A1* | 1/2016 | Chan ....................... G06F 3/165 |
| | | 700/94 |
| 2016/0077710 A1* | 3/2016 | Lewis ................... G06F 16/487 |
| | | 715/716 |
| 2016/0307551 A1* | 10/2016 | Chan ....................... G06F 3/165 |
| 2016/0309445 A1* | 10/2016 | Barat ................ G06F 15/17312 |
| 2017/0064085 A1 | 3/2017 | Schwebel |
| 2017/0091834 A1* | 3/2017 | Sullivan ............. G06Q 30/0277 |
| 2018/0367497 A1* | 12/2018 | Qian .................... H04N 21/258 |

* cited by examiner

NOTIFICATION DELIVERY MECHANISM FOR PRESENT VIEWING USERS

RELATED APPLICATION

This application is a continuation application of U.S. patent application Ser. No. 15/374,518, filed Dec. 9, 2016, the entire content of which is hereby incorporated by reference herein.

TECHNICAL FIELD

This disclosure relates to the field of delivering notifications and, in particular, notification delivery based on content viewing.

BACKGROUND

Service entities transmit notifications to user devices to increase traffic to services of the service entities. The notifications may be transmitted through an application ("app") or as a result of the user subscribing to notification. It is common for a user to have two or more user devices (e.g., phone, tablet, laptop computer, desktop computer, smart television, smart watch, etc.). When a service entity transmits a notification to user devices, the user receives the notifications on each of the user devices of the user. This results in the user being overwhelmed by notifications and removing the application or unsubscribing from notifications.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying a notification to be sent to a user having a plurality of user devices, determining presence of the user on a first user device of the plurality of user devices, determining whether a media player on the first user device is playing media content, and upon determining that the media player on the first user device is playing the media content, transmitting the notification to the first user device without transmitting the notification to other user devices of the plurality of user devices.

In one implementation, the determining of the presence of the user on the first user device includes extracting, from user device interaction history of the user, most recent user device interaction of the user for each of the plurality of user devices, and determining the user most recently interacted with the first user device in response to the extracting.

In one implementation, the determining whether the media player on the first user device is playing the media content includes extracting, from user device interaction history of the user, most recent playback state of the media content for each of the plurality of user devices, the most recent playback state being playing, paused, completed, or duration of the media content viewed, and determining the user most recently viewed the media content on the first user device in response to the extracting.

In one implementation, the determining whether the media player on the first user device is playing the media content comprises periodically receiving a visibility status from the first user device comprising a quantity of time the media content was visible on the first user device and a percentage of visibility.

In one implementation, the method further includes determining the user is present on a first set and a second set of the plurality of user devices, wherein determining the user is present comprises identifying a user input on each of the first set and the second set of the plurality of user devices, determining the first set of the plurality of user devices is playing the media content and the second set of the plurality of user devices is not playing the media content, prioritizing transmission of the notification to the first set of the plurality of user devices prior to transmitting the notification to the second set of the plurality of user devices, wherein the determining whether the media player on the first user device is playing the media content comprises determining whether any of the first set of the plurality of user devices is capable of displaying the notification, and upon determining that none of the first set of the plurality of user devices is capable of displaying the notification, transmitting the notification to a second user device of the second set of the plurality of user devices.

In one implementation, the method further includes: determining a platform of the first user device; and determining that the notification is accessible on the platform, wherein the transmitting of the notification to the first user device is further in response to the determining that the notification is accessible on the platform.

In one implementation, the method further includes: determining the user is present on a first set of the plurality of user devices; upon determining the user has not interacted with the notification within a first quantity of time after transmitting the notification to the first user device, transmitting the notification to the first set of the plurality of user devices; determining the user has used a second set of the plurality of user devices within a threshold amount of time; upon determining the user has not interacted with the notification within a second quantity of time after transmitting the notification to the first set of the plurality of user devices, transmitting the notification to the second set of the plurality of user devices; determining the notification has not been transmitted to a third set of the plurality of devices; and upon determining the user has not interacted with the notification within a third quantity of time after transmitting the notification to the second set of the plurality of user devices, transmitting the notification to the third set of the plurality of user devices.

In one implementation, the determining whether the media player on the first user device is playing the media content comprises determining whether any of the plurality of user devices is both playing the media content and is capable of displaying the notification, the method, further including: generating a plurality of notifications to be transmitted in a first format while the user is not currently playing the media content on any of the plurality of user devices that are capable of displaying the plurality of notifications; upon determining that none of the plurality of user devices is both playing the media content and is capable of displaying the plurality of notifications: storing the plurality of notifications in a queue while the user is not currently playing the media content on any of the plurality of user devices that are capable of displaying the plurality of notifications; and invalidating one or more of the plurality of notifications that have not been transmitted prior to an expiration of a corresponding notification lifetime, wherein a subset of the plurality of notifications have not been invalidated; and transmitting the invalidated one or more of the plurality of notifications in a second format to one or more of the plurality of user devices; and transmitting one or more of the subset of the plurality of notifications to one or more of the plurality of user devices upon determining that the one or more of the plurality of user devices is both playing the media content and is capable of displaying the one or more of the subset of the plurality of notifications.

In one implementation, the plurality of user devices comprises the first user device of the user and a second user device of the user, wherein the user is present on the first user device and the second user device, wherein in response to the user watching the media content on the first user device and not watching the media content on the second user device, transmitting the notification to the first user device without transmitting the notification to the second user device.

In one implementation, the method further includes causing the first user device to display the notification during playing of the media content on the media player on the first user device.

In one implementation, the method further includes causing the first user device to delay displaying the notification on the first user device until the media player completes playback of the media content.

BRIEF DESCRIPTION OF THE DRAWINGS

The present disclosure is illustrated by way of example, and not by way of limitation, in the figures of the accompanying drawings.

DETAILED DESCRIPTION

Figure 1:
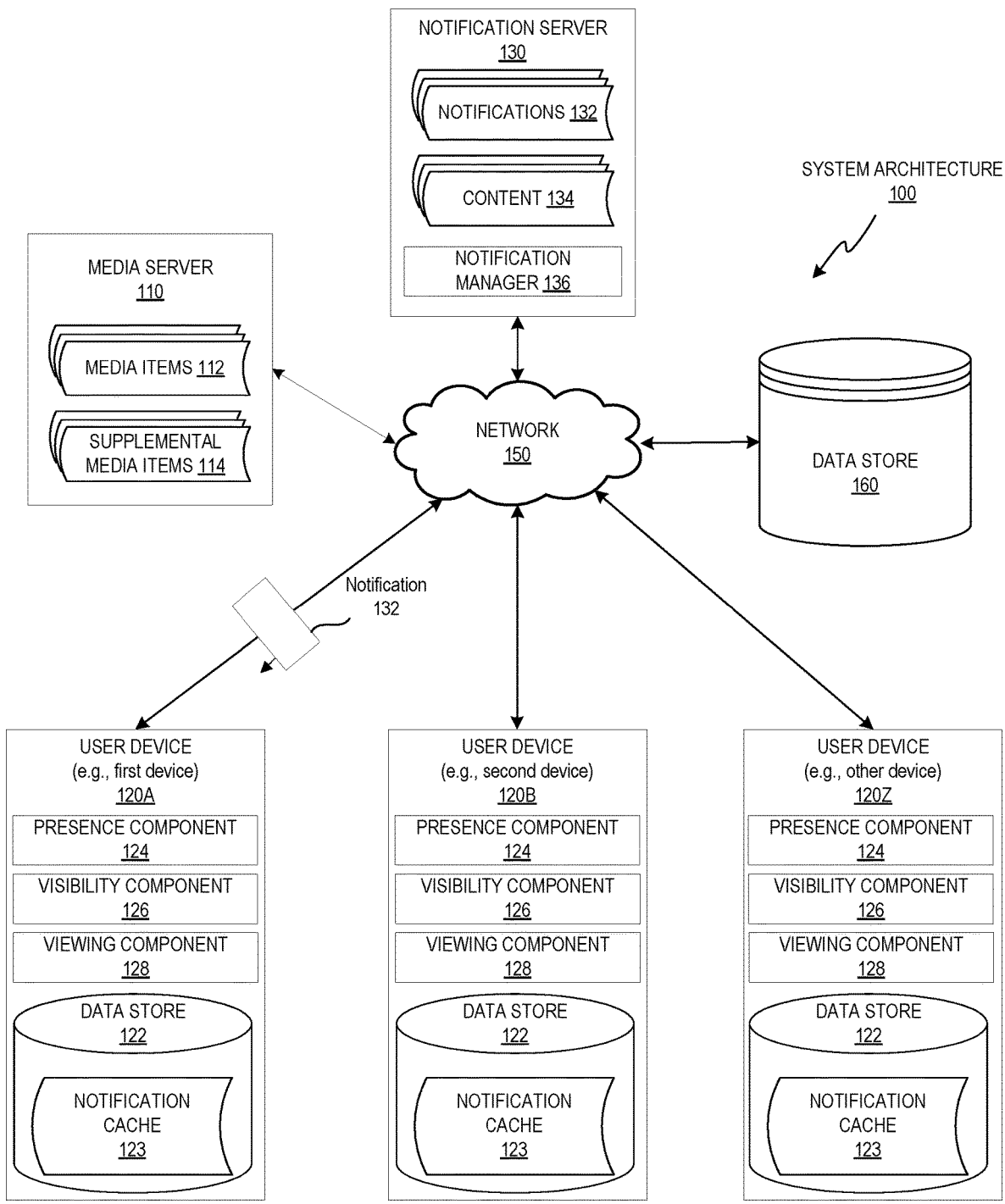
FIG. 1 is a block diagram illustrating an exemplary system architecture, in accordance with an implementation of the disclosure.

Aspects and implementations of the disclosure are directed to a notification delivery mechanism for present viewing users. Service entities (e.g., companies, owners of websites, owners of apps, etc.) want to drive more traffic to their products and services (e.g., websites, media content items, etc.). Increased traffic to products and services may allow service entities to generate more revenue (e.g., by presenting more advertisements). As a result, service entities tend to bombard users with notifications resulting in users tuning off notifications or disabling notifications (e.g., removing apps or unsubscribing from notifications altogether) rather than being overwhelmed by notifications that the users may consider as spam (e.g., notifications that are irrelevant, inappropriate, or indiscriminately sent to user devices). If a service entity transmits too few notifications, a user may miss an opportunity to interact with the product or service.

Traditional systems typically transmit notifications to all user devices and focus on quantity of notifications sent. Although fewer notifications may be sent, traditional systems usually still have the issue of the user receiving the same notification via multiple user devices (e.g., phone, tablet, computer, etc.) of the same user when the user is only currently using one of the user devices. The traditional systems may send lower quality notification so that the notification can be presented on a greater percentage of user devices (e.g., a low-resolution phone and a high-resolution smart television may receive the same notification). However, lower quality notifications may negatively affect user experience and may result in users tuning off or disabling notifications.

Other traditional systems may determine to which user devices to transmit a notification based on the platform of the user device. For example, a service entity may transmit a first type of notification to email, a second type of notification to a desktop computer, a third type of notification to an operating system (e.g., a particular operating system platform), a fourth type of notification to all platforms, etc. The determining factor is the type of notification and the user may still receive multiple notifications via multiple user devices.

Aspects of the present disclosure address the above and other deficiencies by transmitting notifications to a user at the user device the user is currently using. The present disclosure prevents old notifications from piling up on other user devices, prevents multiple notification noises from sounding every time the user receives a notification, and prevents the user from being overwhelmed by the volume of notifications to sort through. Additionally, the present disclosure gives service entities the opportunity to send notifications with a lower expected click-through rate (CTR) (e.g., ratio of users who click on a specific link to the number of total users that view a page, email, or advertisement) only when the user is already watching a media content item via a media player, so that the notifications feel less spammy (e.g., notification feels more relevant, appropriate, or discriminately sent to user devices). The user devices may be devices that are capable of receiving notifications via a network such as phones, tablets, computers, etc.

For example, a user may have a tablet, a smart phone, and a computer. When a service entity transmits a notification to the user, traditionally, three notification sounds will go off at the three user devices (e.g., in response to the notification appearing via the service entity app or operating system of each user device). If the service entity also transmits notification emails, traditionally, six notification sounds will go off from the three user devices (e.g., in response to receiving an email via an email app plus receiving a notification via the service entity app or operating system of each user device). The present disclosure determines a user device the user is currently using to transmit notifications to the user device (e.g., and prevent an email notification) in order to deliver a substantially more pleasant user experience. In one implementation, the present disclosure also determines on which user device the user is currently watching media content via the media player and the notification is sent to that specific user device. For example, if a user is present on multiple user devices, but is only watching one user device (e.g., a virtual reality headset, second screen playback on a television or tablet or computer, etc.), the present disclosure transmits the notification to the user device that the user is watching.

The present disclosure uses the presence of the user on a user device to determine whether to transmit a notification that will keep the user engaged without over-notifying the user. In one implementation, the platform of the user device is also considered (e.g., to filter out notifications for content that is not accessible on the platform of the user device, to focus on content with which the user is more likely to engage on the platform). The present disclosure uses the presence of the user to determine whether and where to transmit a notification.

The technology disclosed herein is advantageous because it enhances notification delivery by determining user presence on user devices and also providing a central mechanism to manage and transmit notifications. The technology may decrease the amount of bandwidth necessary to transmit notifications, which may be beneficial to the notification server, media server, intermediate networking infrastructure (e.g., Internet Service Providers (ISPs), and user devices. In the past, each of the user devices may have received a notification from the notification server and now many of the user devices will not receive notifications. The amount of network traffic required to transmit notifications to user devices where the user is present may be orders of magnitude less than the amount of network traffic or bandwidth required to transmit notifications to all user devices. The technology is also advantageous because it may enhance the ability of the notification server to determine interaction of user devices with notifications and may provide higher quality notifications to relevant user devices.

Implementations of the disclosure often reference displayed notifications for simplicity and brevity. However, the teaching of the present disclosure are applied to notifications generally and can be applied to various types of content or notifications, including for example, video, audio, text, images, program instructions, etc.

FIG. 1 illustrates an example system architecture 100, in accordance with one implementation of the disclosure. The system architecture 100 includes media server 110, user devices 120A-Z, a notification server 130 including a notification manager 136, a network 150, and a data store 160.

Media server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. Media server 110 may be a part of a content sharing platform that may allow users to consume, upload, share, search for, approve of ("like"), dislike, and/or comment on media items. The content sharing platform may also include a website (e.g., a webpage) or application back-end software that may be used to provide a user with access to the media items.

Media server 110 may host content, such as media items 112 and supplemental media items 114. Media items 112 and supplemental media items 114 may be digital content chosen by a user, digital content made available by a user, digital content uploaded by a user, digital content chosen by a content provider, digital content chosen by a broadcaster, etc. Examples of media items 112 and supplemental media items 114 include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

Media items 112 and supplemental media items 114 may be consumed via the Internet and/or via a mobile device application. For brevity and simplicity, an online video (also hereinafter referred to as a video) is used as an example of a media item 112 throughout this document. As used herein, "media," media item," "online media item," "digital media," "digital media item," "content," and "content item" can include an electronic file that can be executed or loaded using software, firmware or hardware configured to present the digital media item to an entity. In one implementation, content sharing platform may store the media items 112 using the data store 160. In one example, media item 112 may be a user generated video identified by a user of user device 120A and supplemental media item 114 may be an advertisement selected by media server 110 to be presented before, during or after presenting media item 112 on one or more of the user devices 120A-Z.

User devices 120A-Z may each include computing devices such as personal computers (PCs), laptops, mobile phones, smart phones, tablet computers, netbook computers, network-connected televisions, smart speakers, smart cars, smart watches, electronic readers (e-readers), smart glasses, gaming systems, etc. In some implementations, user devices 120A-Z may also be referred to as "client devices." User devices 120A-Z may be capable of receiving media items 112 from media server 110 over a network 150.

Notification server 130 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. Notification server 130 may be a part of one or more platforms (e.g., a content sharing platform, mobile operating system (OS), computer OS, an Internet browser, app platform, email platform, etc.) that may allow transmitting of one or more types of notifications 132 and receive indication of interaction with (e.g., select, delete, ignore, etc.) the notifications 132. Each of the one or more platforms may also include a website (e.g., a webpage) or application back-end software that may be used to provide a user with access to the content 134. A notification may be associated with corresponding content 134. Upon selection of a notification 132 by a user, a user may be provided access to the corresponding content 134.

Notification server 130 may include a notification manager 136. The notification manager 136 may identify a notification 132 to be sent to a user having a plurality of user devices 120A, 120B, 120Z, etc. The notification manager 136 may determine presence of the user on a first user device 120A of the plurality of user devices 120A-Z. The notification manager 136 may determine whether a media player on the first user device 120A is playing media content and upon determining that the media player on the first user device 120A is playing the media content, the notification manager 136 may transmit the notification 132 to the first user device 120A without transmitting the notification to other user devices 120B-Z of the plurality of user devices.

Notification server 130 may host or provide access to content 134, such as media items 112, supplemental media items 114, emails, posts, information regarding products, information regarding services, advertisements, etc. Content 134 may be digital content chosen by a user, digital content made available by a user, digital content uploaded by a user, digital content chosen by a content provider, digital content chosen by a broadcaster, etc. Examples of content 134 include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. Examples of notifications 132 include one or more of video, audio, text, images, program instructions, etc.

Notification server 130 may store a queue of notifications (e.g., in data store 160, in the notification server 130, etc.). The notifications may be generated when the user is not present on user devices or is not watching media content via a media player on a user device (e.g., generated at 3:00 am). Instead of sending the notifications at an inappropriate time (when the user is less likely to select the notification), the notifications may be sent to the notification queue. The notifications from the notification queue may either be invalidated once the lifetime of the notification expires or be transmitted to the user device once the user is present on a user device or is watching media content via a media player on a user device. Some types of notifications (e.g., new content recommendations) may be reasonably sent when the user is present and viewing media content via a media player of a user device, but otherwise considered spammy or distracting. The notification server 130 may determine the type of notification and store the notification in a notification queue until the user is both present and viewing media on a media device.

Network 150 may be a public network that provides one or more of user devices 120A-Z with access to media server 110 and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Each of user devices 120A-Z may include a media viewer that allows users to view one or more of media items 112, supplemental media items 114, notifications 132, content 134, etc. that are shared or transmitted over network 150. The media viewer may present images, videos, audio, web pages, documents, etc. In one example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant). In another example, the media viewer may be a standalone application (e.g., a mobile application or app) that allows users to view digital media items (e.g., digital videos, digital images, electronic books, etc.).

According to aspects of the disclosure, the media viewer may be a content sharing platform application for users to share, record, edit, and/or upload content to the one or more platforms. The media viewer may be provided to user devices 120A-Z by media server 110 or one or more platforms. For example, the media viewers may be embedded media players that are embedded in web pages provided by the one or more platforms. In another example, the media viewers may be applications that are installed and executed on user devices 120A-Z.

In the example shown in FIG. 1, each user device may include a presence component 124, a visibility component 126, a viewing component 128, and a data store 122.

Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers). Data store 122 may include a notification cache 123 that includes copies of notifications 132 and content 134 that are received from notification server 130. In one implementation, notification cache 123 may also include copies of media items that are received from the media server 110. In one example, each media item 112, notification 132, and content 134 may be a file that is downloaded from media server 110 or notification server 130 and may be stored locally in notification cache 123. In another example, each media item 112, notification 132, and content 134 may be streamed from media server 110 or notification server 130 and may exist as an ephemeral copy in memory of a user device until it is off-lined. Off-lining refers to a user device storing an ephemeral copy of the streaming media item 112, notification 132, or content 134 in persistent data storage of the user device 120. This may enable the user device 120 to access the streamed media item 112, notification 132, or content 134 at a later point in time (e.g., after a reboot) without using an internet connection. In one example, the media item 112, notification 132, or content 134 may be streamed by the user device 120 to itself when presenting the media item 112, notification 132, or content 134. In one example, a user device 120 may off-line a streamed media item 112, notification 132, or content 134 by copying one or more streams of a media item 112, notification 132, or content 134 (e.g., video stream, audio stream, text, image, etc.) to the persistent data storage.

Presence component 124 may include functionality that determines presence of the user on the user device 120. Presence component 124 may determine user input (e.g., a search request, a logged button click) that reveals presence of the user on the user device 120. Presence component 124 may determine the time of the user input (e.g., current user input, user input five minutes ago, duration of user input, etc.)

Visibility component 126 may include functionality that determines whether a media player (e.g., media viewer) on the user device 120 is playing media content. The visibility component 126 may determine a most recent playback state (e.g., playing, paused, completed, or duration of the media content viewed, etc.) of the media content for the user device 120.

Viewing component 128 may include functionality that determines whether the user device 120 is capable of presenting a notification 132 and history of interacting with (e.g., selecting, closing, ignoring, etc.) notifications 132. The user device 120 may operate on a particular platform (e.g., a particular operating system platform, etc.) and the viewing component 128 may determine if the notification 132 is accessible on the platform of user device 120.

In general, functions described in one implementation as being performed by the content sharing platform can also be performed on the user devices 120A through 120Z in other implementations, if appropriate. In addition, the functionality attributed to a particular component can be performed by different or multiple components operating together. The content sharing platform, media server 110, and notification server 130 can also be accessed as a service provided to other systems or devices through appropriate application programming interfaces, and thus is not limited to use in websites.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform.

Although implementations of the disclosure are discussed in terms of a notification server 130, media server 110, and a content sharing platform, implementations may also be generally applied to any type of social network providing digital content and connections between users.

In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform.

Figure 2:
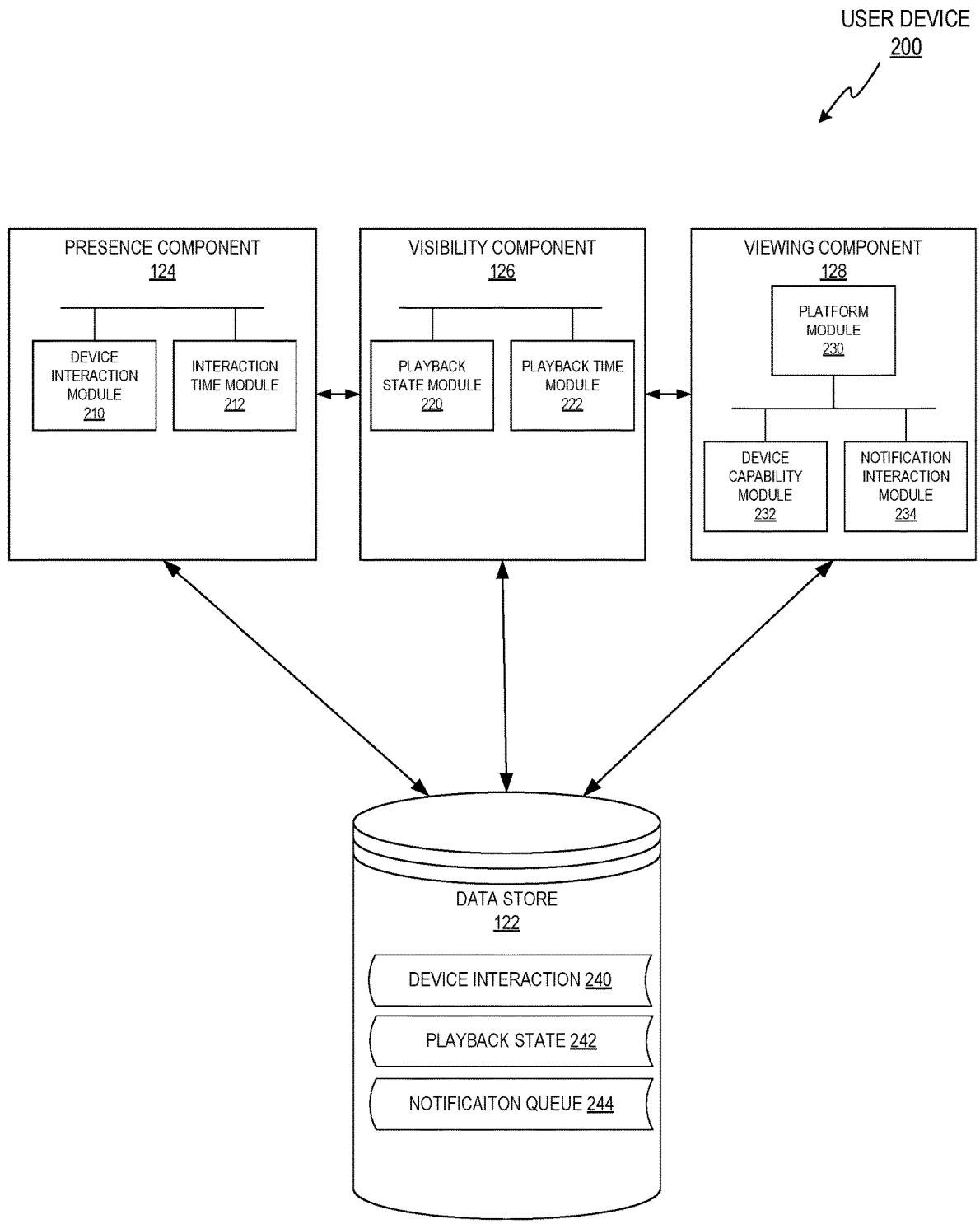
FIG. 2 is a block diagram illustrating the components and modules of an example user device, in accordance with an implementation of the disclosure.

FIG. 2 is a block diagram illustrating an example user device 200. User device 200 may be the same or similar to user devices 120A-Z. In the example shown in FIG. 2, user device 200 includes presence component 124, visibility component 126, viewing component 128, and data store 122.

Presence component 124 may include device interaction module 210 and interaction time module 212.

Device interaction module 210 may determine presence of the user on the user device 200. Presence of the user may be determined by user interaction with (e.g., user input on) the user device 200. Device interaction module 210 may determine the type of interaction (e.g., dismissing a notification, transmitting a search request, a logged button click, etc.). In one implementation, device interaction module 210 considers any type of interaction for determining user presence. In another implementation, device interaction module excludes one or more types of interactions (e.g., user input via a ring/silent button, user input via a sleep/wake button, user input via a volume up/down button, user input without proceeding past a lock screen or login screen, etc.). Device interaction module 210 may store the user interactions in device interaction 240 of data store 122.

Interaction time module 212 may determine duration of one or more user interactions with a user device 200, the time of day of each user interaction with the user device 200, and/or the time of day of the most recent interaction. In one implementation, interaction time module 212 considers any length of time of interaction for determining user presence. In another implementation, device interaction module excludes interactions with a length of time less than a threshold amount of time (e.g., an interaction that is less than 5 seconds). In another implementation, each type of interaction may have its own corresponding threshold amount of time in determining whether the interaction should be excluded (e.g., moving of a pointer (e.g., via a mouse) may need to be for at least a first threshold amount of time (e.g., 5 seconds) to be considered, entering text may need to be for at least a second threshold amount of time (e.g., 2 seconds, etc.) to be considered). Interaction time module 212 may store the time of day and/or length of time of user interactions in device interaction 240 of data store 122.

The presence status of the user device 200 may define the type of user presence on the user device and may be based on user interactions, time of interactions, and length of time of user interactions stored in device interaction 240. User device 200 may periodically transmit the presence status of the user device 200 to the notification server 130 (e.g., ping the notification server 130 with a presence status) corresponding to the last predetermined amount of time (e.g., the last several seconds). The presence status may include the time of interaction, duration of interaction, and in some implementations the type of interaction.

User device interaction history of the user may include device interaction 240 in data store 122. The notification server 130 may extract from the user device interaction history of the user (e.g., device interaction 240), most recent user device interaction for the user for each of the user devices of the user. The notification server 130 may determine the user most recently interacted with the user device 200 in response to the extracting and may transmit the notification to user device 200.

Visibility component 126 may include playback state module 220 and playback time module 222.

Playback state module 220 may determine the playback state of the media player (e.g., media viewer) on user device 200. The playback state may be one or more of playing, paused, completed, or duration of the media content viewed. The playback state module 220 may store the playback state in playback state 242 of data store 122.

Playback time module 222 may determine the duration of time that the media content is playing on the media player of the user device 200. The playback time module 222 may also determine the duration of the media content viewed (e.g., 2 minutes of a 5 minute media item). The playback time module 222 may store the playback time of the corresponding playback state (e.g., time of playing, time of paused, etc.) in playback state 242 of data store 122.

The playback state and corresponding playback time may be a visibility status of the user device 200 (e.g., the user is viewing media content via a media player of the user device 200 for a quantity of time). User device may periodically transmit the visibility status to the notification server 130 corresponding to the last predetermined amount of time (e.g., the last several seconds). The visibility status may include a histogram of the amount of time media content was played on the media player of the user device 200 at a percentage of visibility (e.g., percent of of the media player that was viewable via the user device 200 (e.g., not obscured by another window, not minimized, not off screen, etc.) and percent of time that the media player was playing media (e.g., not paused), etc.).

The notification server 130 may determine whether a media player on user device 200 is playing media content by periodically receiving a visibility status (e.g., quantity of time the media content was visible on the first user device and a percentage of visibility (e.g., percent of of the media player that was viewable via the user device 200 (e.g., not obscured by another window, not minimized, not off screen, etc.) and percent of time that the media player was playing media (e.g., not paused)) from the user device 200.

In one implementation, the notification server 130 transmits a notification to user device 200. The user device 200 may determine, via playback state module 220, that the user device 200 is not currently playing media content. Upon determining user device 200 is not currently playing media content, notification server 130 or the user device 200 may store the notification (e.g., in data store 160, in notification queue 244 of data store 122). The notification interaction module 234 may determine if the notification has been presented via user device 200. The notification may be invalidated if it has not been presented prior to an expiration of a corresponding notification lifetime, and the invalidated notification may be transmitted in a different format to the user (e.g., bundled with other notifications, transmitted by email, etc.). For example, notifications may remain unsent because the user did not view media content via a media player on a user device that is capable of presenting the notifications (e.g., not a notifiable user device) during the lifetime of the notifications. These notifications may be packaged and sent as a notification bundle or a different notification format (e.g., email). The notification stored in data store 160 or in notification queue 244 may be presented via user device 200 in response to playback state module 220 determining the user device 200 is playing media content via a media player and device capability module 232 determining the user device 200 is capable of presenting the notification.

In another implementation, a notification is presented on user device 200 during playing of media content on the media player on the user device 200. In another implementation, presenting a notification is delayed until after the media player is no longer playing media content.

User device 200 may present the notification in a graphical interface. An example GUI will be discussed in more detail in regards to FIGS. 4A-B.

User device interaction history of the user may include playback state 242 in data store 122. The notification server 130 may extract from the user device interaction history of the user (e.g., playback state 242), most recent playback state of the media content for each of the user devices of the user. The notification server 130 may determine the user most recently viewed the media content on the user device 200 in response to the extracting and may transmit the notification to the user device 200.

Viewing component 128 may include platform module 230, device capability module 232, and notification interaction module 234.

Platform module 230 may determine the platform of the user device 200. The platform may include one or more of operating system (OS) of the user device 200, version of the OS of the user device 200, available memory on user device 200, resolution capacity of user device 200, apps and programs installed on user device 200, etc. Platform module 230 may notify the notification server 130 of which platforms the user device 200 can present notifications (e.g., present notifications at a minimum quality standard determined by the notification owner).

Device capability module 232 may determine the notification is accessible on the platform (e.g., capability of the user device 200 of presenting a notification (e.g., text, video, audio, etc.)). A notification may be an invitation to consume an item or perform an activity. Device capability module 232 may determine the user device 200 is capable of consuming the item (e.g., user device 200 is capable of playing a media item at a quality accepted by the owner of the media item, etc.) or capable of performing the action (e.g., if the notification is a link to a website that uses a particular media player, only user devices 200 that have a particular media player may be deemed capable of performing the action).

In one implementation, notification server 130 transmits a notification to user device 200 and device capability module determines if the notification can be presented on the user device 200. Upon determining the notification cannot be presented on user device 200, device capability module 232 may cause the notification to be discarded. In another implementation, notification server 130 notifies the notification server 130 about the platform capabilities of the user device 200. Device capability module 232 may communicate with the notification server 130 to determine whether user device 200 is capable of presenting a notification. The communication of the device capability module 232 with the notification server 130 may involve receiving a capability request and transmitting a capability response.

Notification interaction module 234 may determine interactions of a user with a notification. The notification may be presented via a GUI of user device 200. User interactions with the notification may be selecting, closing, or ignoring.

The notification server may determine that the user is present on user device 200 and that a media player is playing media content on the user device 200, that the user is present on a first set of the user devices, that the user has used a second set of user devices within a threshold amount of time (e.g., 5 hours), and that the user has a third set of user devices that do not include the user device 200, the first set, and the second set. The notification server 130 may first transmit a notification to user device 200. Notification interaction module 234 may indicate to the notification server 130 that the user has not interacted with the notification within a first quantity of time after the notification was transmitted from the notification server 130 to the user device 200. Upon receiving the indication that the user of user device 200 has not interacted with the notification for the first quantity of time, the notification server 130 may transmit the notification to a first set. Upon receiving indication that the user has not interacted with the notification for a second quantity of time after transmitting the notification to the first set, the notification server 130 may transmit the notification to the second set. Upon receiving indication that the user has not interacted with the notification for a third quantity of time after transmitting the notification to the second set, the notification server 130 may transmit the notification to the third set (e.g., all remaining registered user devices of the user, user devices of the user that have not received the notification).

Figure 3:
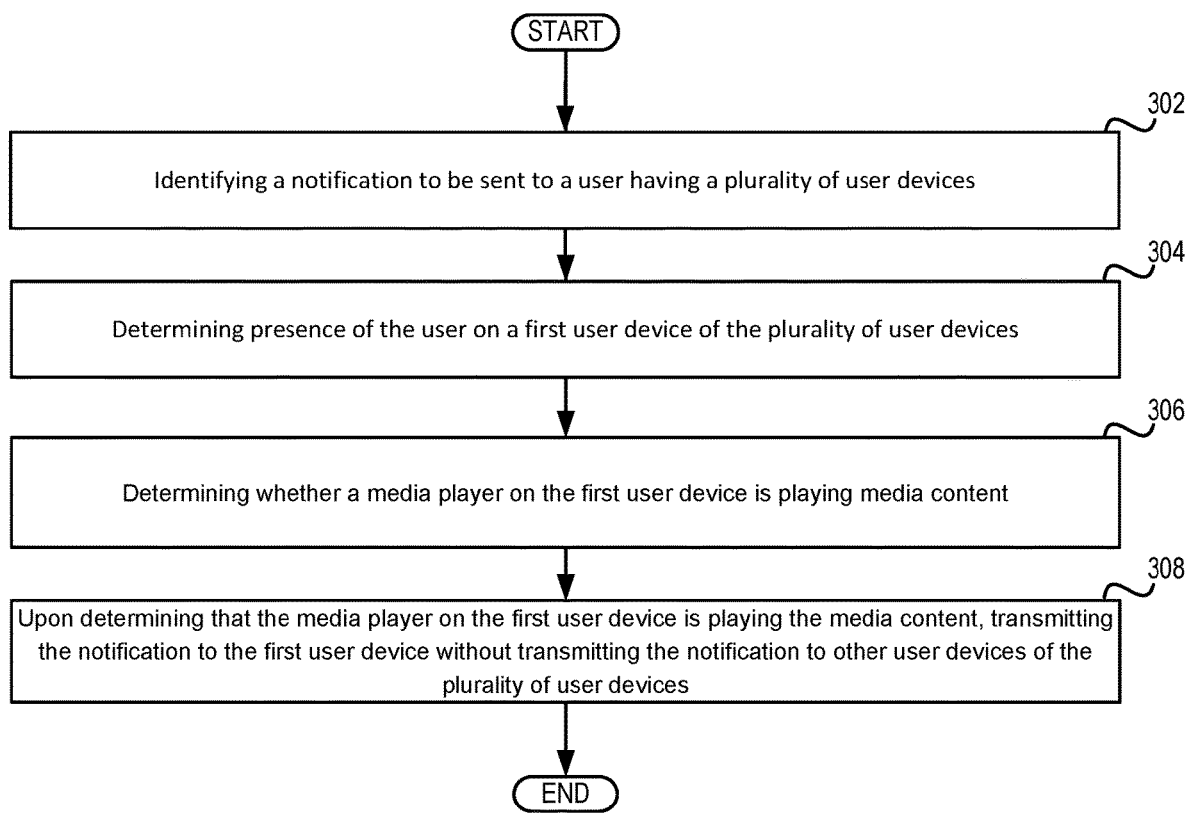
FIG. 3 is a flow diagram illustrating an example method of a notification server, in accordance with an implementation of the disclosure.

FIG. 3 depicts a flow diagram for illustrative examples of methods 300 for implementing an access control mechanism for peer-to-peer media sharing. Method 300 illustrates an example process flow from the perspective of a notification server 130. Method 300 may be performed by processing devices that may comprise hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by notification server 130.

Referring to FIG. 3, method 300 may be performed by one or more processing devices of a notification server 130 and may begin at block 302. At block 302, the processing device of the notification server 130 may identify a notification to be sent to a user having a plurality of user devices (e.g., a phone, a tablet, a computer, etc.).

At block 304, the processing device may determine presence of the user on a first user device 200 of the plurality of user devices. In one implementation, block 304 includes extracting, from user device interaction history of the user (device interaction 240), most recent user device interaction of the user for each of the plurality of user devices and determining the user most recently interacted with the first user device 200.

At block 306, the processing device may determine whether a media player on the first user device 200 is playing media content. In one implementation, block 306 includes extracting, from user device interaction history of the user (playback state 242), most recent playback state (e.g., playing, paused, completed, or duration of the media content viewed) of the media content for each of the plurality of user devices and determining the user most recently viewed the media content on the first user device 200. In one implementation, block 306 includes periodically receiving a visibility status from the first user device comprising a quantity of time the media content was visible on the first user device 200 and a percentage of visibility.

At block 308, upon determining that the media player on the first user device 200 is playing the media content, the processing device may transmit the notification to the first user device 200 without transmitting the notification to other user devices of the plurality of user devices. In one implementation, the plurality of user devices comprises the first user device 200 of the user and a second user device of the user, where the user is present on the first user device and the second user device, where in response to the user watching the media content on the first user device 200 and not watching the media content on the second user device, transmitting the notification to the first user device 200 without transmitting the notification to the second user device.

In one implementation, method 300 may further include determining a platform of the first user device and determining that the notification is accessible on the platform, wherein the transmitting of the notification to the first user device is further in response to the determining that the notification is accessible on the platform.

The notification may include one or more of video, audio, text, images, program instructions, etc. In one implementation, the notification may be an element of a graphical user interface (GUI) (e.g., a window, a pop-up window, a banner, an alert, a badge app image, a notification in a media player, etc.) as discussed in more detail in regards to FIGS. 4A-B.

Figure 4A:
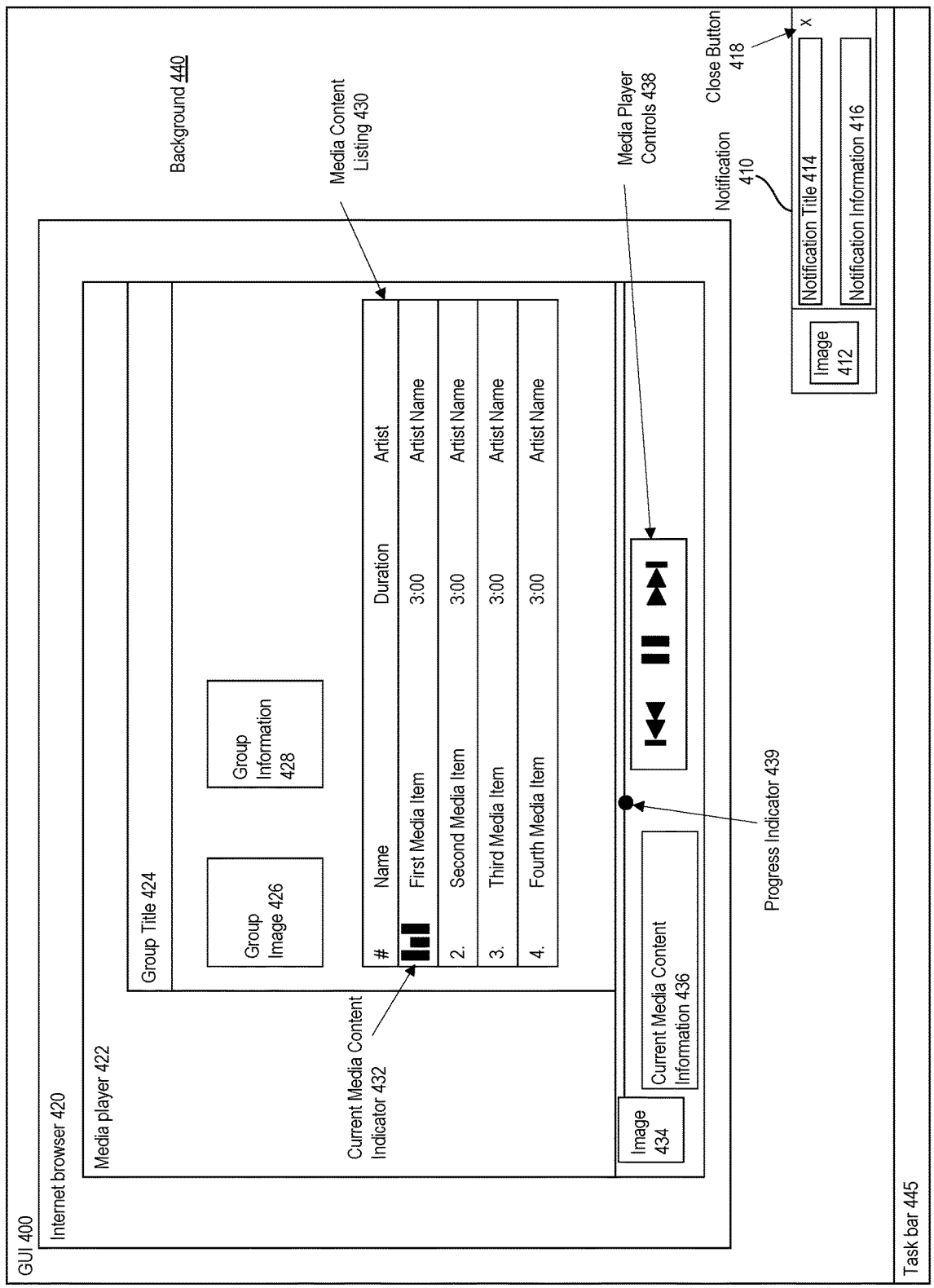
FIG. 4A illustrates an example graphical user interface (GUI) of a user device that has received a notification, in accordance with an implementation of the disclosure.

FIG. 4A illustrates an example GUI 400 of a user device 120A that has received a notification 410, in accordance with an implementation of the disclosure. GUI 400 may include a notification 410, an internet browser 420, a task bar 445, and a background 440.

The internet browser 420 may display a media player 422. The media player 422 may display one or more media items and a current media item (e.g., a media item that is currently playing or was most recently played, paused, stopped, or selected). The one or more media items may be part of a group of media items such as an album, playlist, channel, media items selected by a user, etc. The media player 422 may display a group title 424, a group image 426, group information 428, a media content listing 430 (e.g., list of media items, corresponding duration, and corresponding artist name), a current media content indicator 432 (e.g., indicates which media item is playing or is paused), an image 434 of the current media item (e.g., image of the media item, album, or artist that is playing or is paused), current media item information 436 (e.g., name of the media item that is currently playing), and media player controls 438. The media player controls 438 may include one or more of skip, fast forward, rewind, play, pause, stop, volume, shuffle, repeat, like, dislike, add to playlist, more information, etc. The media player 422 may display a progress bar or seek bar that includes a progress indicator 439 that shows what percentage of the media item has been played and can be dragged to a different location on the progress bar or seek bar to play a different portion of the media item (e.g., drag to the right to fast forward the media item to a later point of the media item).

The media server 110 or notification server 130 may identify a notification 410 to be sent to a user having a plurality of user devices 120A, 120B, 120Z, etc. The notification server 130 may determine presence of the user on the user device 120A (e.g., user input within a threshold amount of time, current user input, more recent user input on 120A than on the other user devices, etc.) and determine the media player 422 on the user device 120A is playing media content. The notification server 130 may transmit the notification 410 to the user device 120A without transmitting the notification to other user devices 120B, 120Z, etc.

The notification 410 may be displayed on a relevant user device 120A (e.g., where the user is present and playing media content via a media player 422) in a manner that attracts attention without being too obtrusive. The user may be able to continue the activities (e.g., consuming a media content item, using a software application, etc.) the user was performing on the user device 120A before displaying of the notification 410 while the notification 410 is displayed. For example, the notification 410 may be displayed proximate a corner of the GUI 400 without obscuring the task bar 445.

The notification 410 may include one or more of an image 412, a notification title 414, notification information 416, and a close button 418. The notification 410 may be one or more of an advertisement, a suggested media item, etc. The image 412 may provide a visual representation of the notification 410 (e.g., an image of the album or artist) of a suggested media item in the notification 410). The notification title 414 may be a description of the notification 410 (e.g., the name of the suggested media item). The notification information 416 may be further description of the notification 410 (e.g., name of the artist of the media item, name of the album of the media item). The close button 418 may be one or more of an "x," a textual representation (e.g., the word "close"), etc.

In one implementation, the notification 410 may be displayed on the GUI 400 until a user interacts with (e.g., dismisses, selects, etc.) the notification 410. In another implementation, if the user does not interact with the notification 410 (e.g., the notification is ignored) during a predetermined amount of time (e.g., 5 seconds, 30 seconds, etc.), the notification 410 may cease to be displayed on the GUI 400. In one implementation, if the user interacts with (e.g., dismisses, selects) the notification 410, the notification remains displayed on the GUI 400 for a predetermined amount of time (e.g., 5 seconds).

Interactions with the notification 410 may include dismissing, selecting, etc. Dismissing the notification 410 may be performed by selecting the close button 418. Upon dismissing the notification 410, the notification 410 may be removed from the GUI 400. Selection of the notification 410 is displayed in FIG. 4B.

Figure 4B:
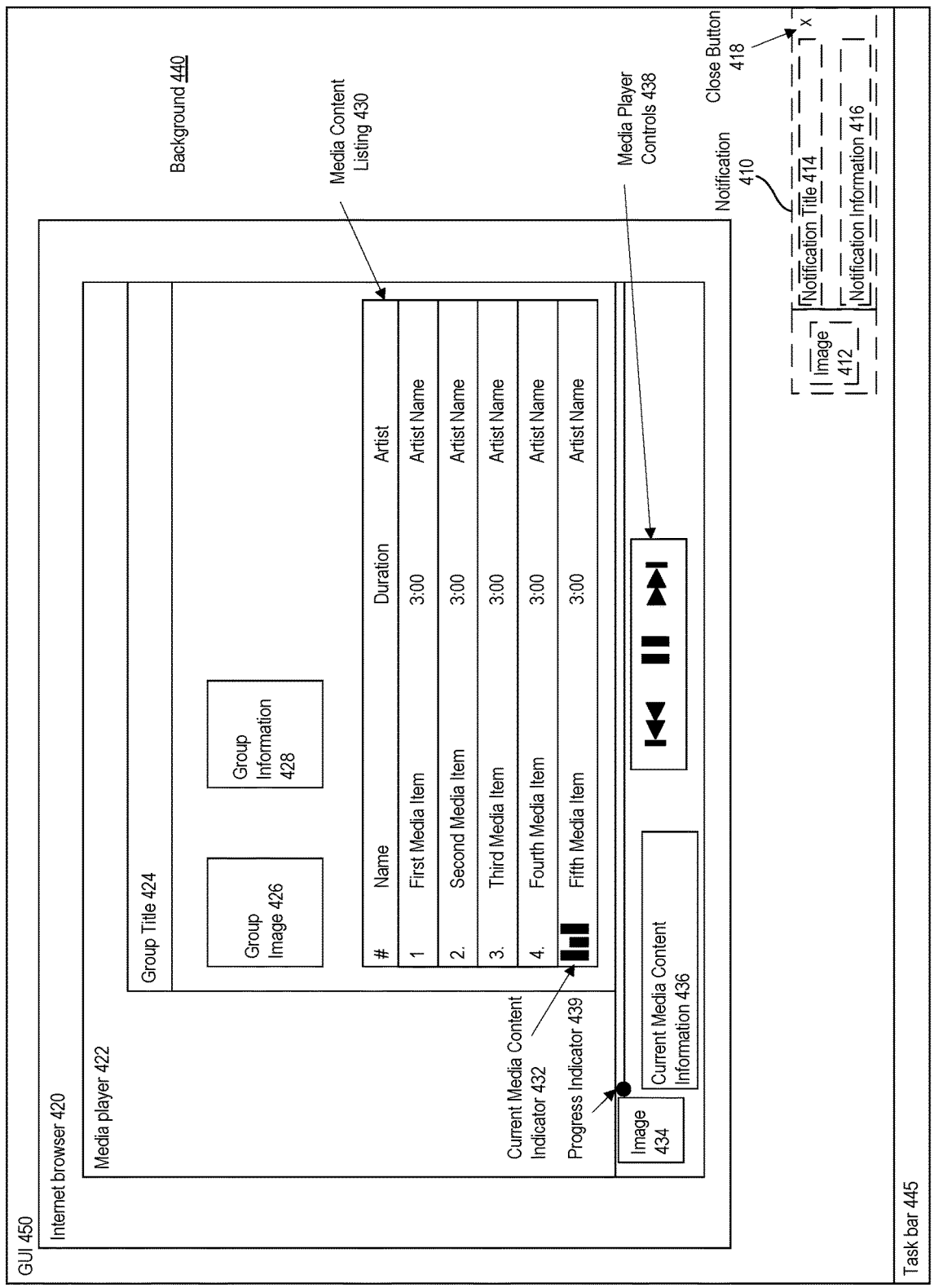
FIG. 4B illustrates an example GUI of a user device that has selected a received notification, in accordance with one implementation.

FIG. 4B illustrates an example GUI 450 of a user device 120A that has selected a received notification 410, in accordance with one implementation.

Selecting the notification 410 may be performed by selecting one or more of the notification image 412, the notification title 414, the notification information 416, or any portion of the notification 410 other than the close button 418.

The notification 410 may be an invitation to consume an item (e.g., purchase a media item, play a media item on the media player 422, etc.) or perform an activity (e.g., go to a website of the service entity corresponding to the notification 410) indicated by one or more of the notification title 414 or notification information 416. Upon selecting the notification 410, the user device 120A may accept the invitation and consume the item or perform the activity indicated. For example, the notification 410 may include notification title 414 of a name of a media item and the notification information 416 of the author and album corresponding to the media item. Upon selecting the notification 410, the corresponding media item may start playing on the media player 422. The media player 422 may present one or more additional media items in the same group (e.g., album) as the media item corresponding to the notification 410. The media player 422 may add the media item corresponding to the notification 410 to the media content listing 430 of FIG. 4A to generate the media content listing 430 of FIG. 4B.

Selecting of the notification 410 may update the media player 422. The media player 422 may be updated to display an updated group title 424 (e.g., the album and the artist), an updated group image 426 (e.g., an image of the album or the artist), updated group information 428 (e.g., number of media items, album duration, publication year (genre, etc.), an updated media content listing 430 (e.g., media items in the album), an updated current media content indicator 432 (e.g., indicates which media item is playing or is paused), an updated image 434 of the current media item (e.g., image of the media item, album, or artist that is playing or is paused), an updated current media item information 436 (e.g., name of the media item and name of the artist that is currently playing), and media player controls 438.

Selecting of notification 410 may play the media item corresponding to notification 410 (e.g., notification title 414, notification information 416, etc.) via the media player 422. For example, selecting the notification 410 may display the media item of the notification in the media content listing 430 with the current media content indicator 432 displayed next to the media item of the notification. The image 434 and current media item information 436 may also reflect the media item from the notification 410.

In one implementation, the current media item from FIG. 4A and the content of the notification 410 may refer to media items from the same album. In another implementation, the current media item from FIG. 4A and the content of the notification 410 may refer to media items from different albums, different types of media items (e.g., a song, video, etc.), or different types of content (e.g., media item, website, advertisement for a product or service, etc.). Upon selection of the notification 410, one or more of a new internet browser 420, a new media player 422, a new group title 424, a new group image, new group information 428, new media content listing 430, etc. may be displayed (e.g., internet browser 420 may display a different website, media player 422 may display a different album, etc.)

Upon selecting the notification 410, the notification 410 may be displayed for a predetermined amount of time (e.g., 5 seconds), the notification 410 may be removed from the GUI 450 (e.g., no longer display on GUI 450, or the notification 410 may become less prominent on GUI 450 (e.g., may become transparent, may be blurred, may be reduced in size, etc.).

Figure 5:
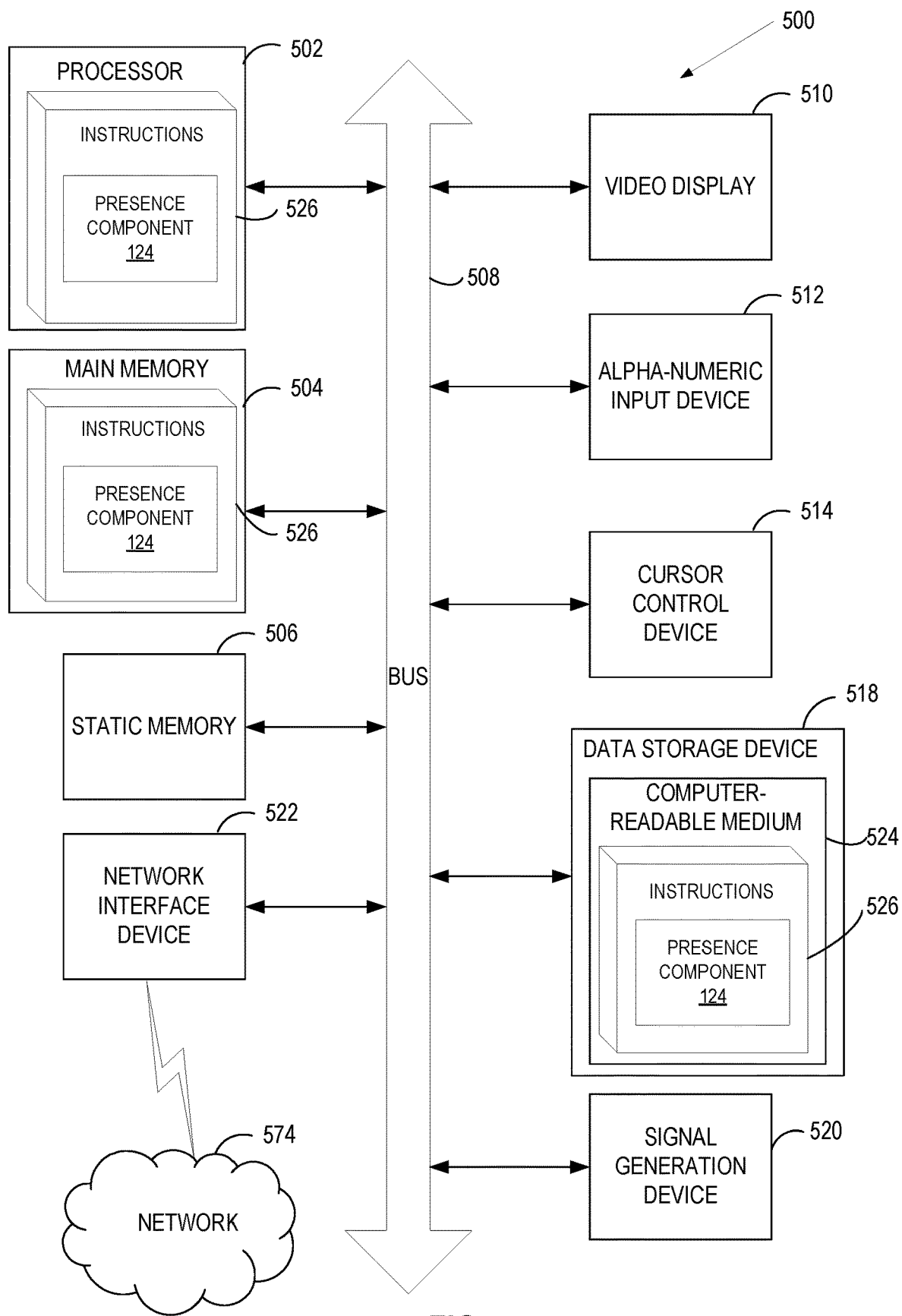
FIG. 5 is a block diagram illustrating one implementation of a computer system, in accordance with an implementation of the disclosure.

FIG. 5 depicts a block diagram of a computer system operating in accordance with one or more aspects of the present disclosure. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding presence component 124 of FIG. 2 and for implementing method 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" (e.g., non-transitory machine-readable storage medium) shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "transmitting," "extracting," "prioritizing," "generating," "storin" g, "invalidating," "causing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying a notification to be sent to a user having a plurality of user devices;
   selecting a first user device of the plurality of user devices based on a playback state of the first user device and a quantity of time media content was visible on the first user device; and
   upon selecting the first user device, transmitting the notification to the first user device without transmitting the notification to other user devices of the plurality of user devices.

2. The method of claim 1 further comprising:
   extracting, from user device interaction history of the user, a corresponding most recent playback state for each of the plurality of user devices; and
   determining the playback state of the first user device is most recent among corresponding most recent playback states of the plurality of user devices.

3. The method of claim 2, wherein the playback state of the first user device is a streaming state.

4. The method of claim 2, wherein the corresponding most recent playback state is any one of a playing state, a paused state, or a completed state.

5. The method of claim 1 further comprising:
   receiving a visibility status from the first user device, the visibility status comprising the quantity of time the media content was visible on the first user device.

6. The method of claim 1, wherein the selecting of the first user device is further based on a percentage of visibility of the media content on the first user device.

7. The method of claim 1 further comprising:
   extracting, from user device interaction history of the user, most recent user device interaction of the user for each of the plurality of user devices; and
   determining the user most recently interacted with the first user device in response to the extracting, wherein the selecting of the first user device is further based on the determining that the user most recently interacted with the first user device.

8. A system comprising:
   a memory; and
   a processing device coupled to the memory, wherein the processing device is to:
   identify a notification to be sent to a user having a plurality of user devices;
   select a first user device of the plurality of user devices based on a playback state of the first user device and a quantity of time media content was visible on the first user device; and upon selecting the first user device, transmit the notification to the first user device without transmitting the notification to other user devices of the plurality of user devices.

9. The system of claim 8, wherein the processing device is further to:
extract from user device interaction history of the user, a corresponding most recent playback state for each of the plurality of user devices; and
determine the playback state of the first user device is most recent among corresponding most recent playback states of the plurality of user devices.

10. The system of claim 9, wherein the playback state of the first user device is a streaming state.

11. The system of claim 9, wherein the corresponding most recent playback state is any one of a playing state, a paused state, or a completed state.

12. The system of claim 8, wherein the processing device is further to receive a visibility status from the first user device, the visibility status comprising the quantity of time the media content was visible on the first user device.

13. The system of claim 8, wherein the processing device is to select the first user device further based on a percentage of visibility of the media content on the first user device.

14. The system of claim 8, wherein the processing device is further to:
extract, from user device interaction history of the user, most recent user device interaction of the user for each of the plurality of user devices; and
determine the user most recently interacted with the first user device in response to extracting the most recent user device interaction of the user for each of the plurality of user devices, wherein the processing device is to select the first user device further based on determining that the user most recently interacted with the first user device.

15. A non-transitory machine-readable storage medium storing instructions which, when executed cause a processing device to perform operations comprising:
identifying a notification to be sent to a user having a plurality of user devices;
selecting a first user device of the plurality of user devices based on a playback state of the first user device and a quantity of time media content was visible on the first user device; and
upon selecting the first user device, transmitting the notification to the first user device without transmitting the notification to other user devices of the plurality of user devices.

16. The non-transitory machine-readable storage medium of claim 15, wherein the operations further comprise:
extracting from user device interaction history of the user, a corresponding most recent playback state for each of the plurality of user devices; and
determining the playback state of the first user device is most recent among corresponding most recent playback states of the plurality of user devices.

17. The non-transitory machine-readable storage medium of claim 16, wherein the playback state of the first user device is a streaming state.

18. The non-transitory machine-readable storage medium of claim 16, wherein the corresponding most recent playback state is any one of a playing state, a paused state, or a completed state.

19. The non-transitory machine-readable storage medium of claim 15, wherein the operations further comprise:
receiving a visibility status from the first user device, the visibility status comprising the quantity of time the media content was visible on the first user device.

20. The non-transitory machine-readable storage medium of claim 15, wherein the operations further comprise:
extracting, from user device interaction history of the user, most recent user device interaction of the user for each of the plurality of user devices; and
determining the user most recently interacted with the first user device in response to the extracting, wherein the selecting of the first user device is further based on the determining that the user most recently interacted with the first user device.

* * * * *